Figure 5:
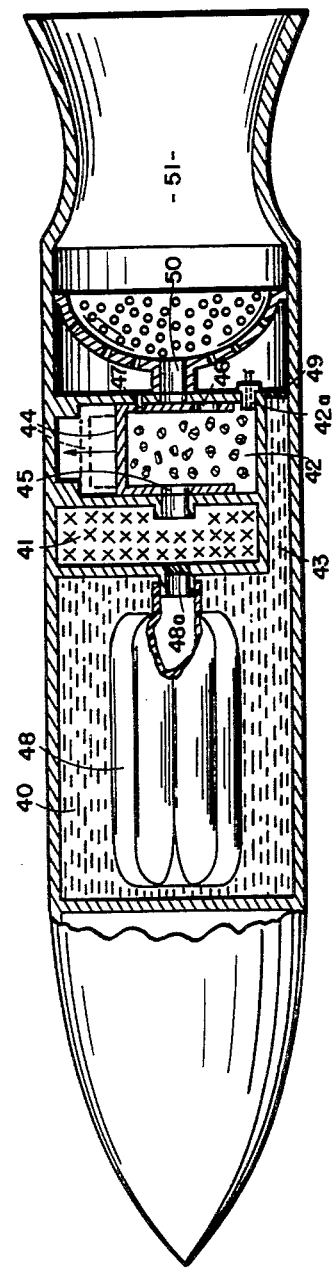

June 14, 1960   J. R. CONYERS ET AL   2,940,256
ULLAGE COMPENSATION FOR PRESSURIZING SYSTEMS
Filed March 26, 1954   2 Sheets-Sheet 1
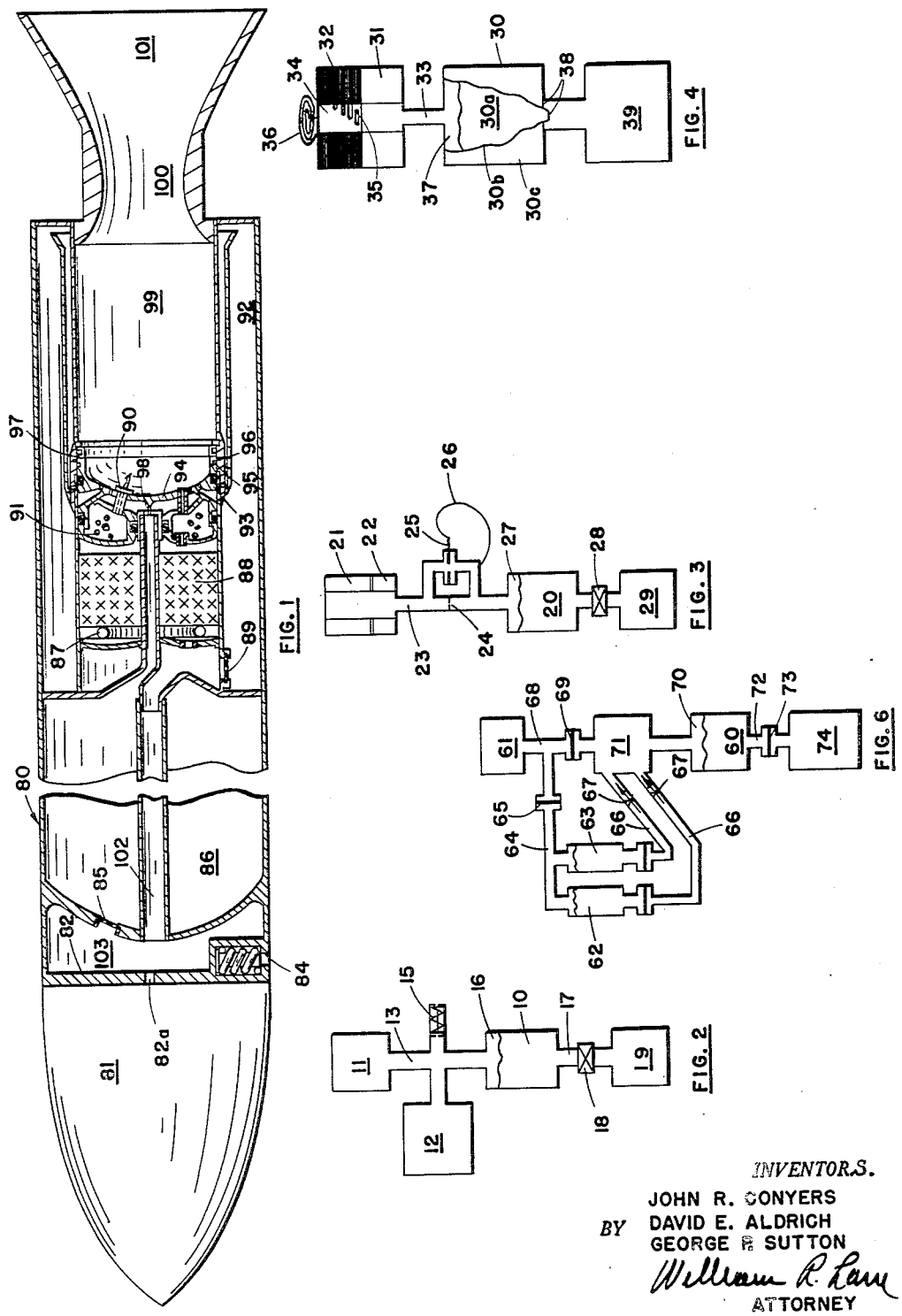
INVENTORS.
JOHN R. CONYERS
DAVID E. ALDRICH
GEORGE P. SUTTON
BY William R. Lary
ATTORNEY

INVENTOR.
JOHN R. CONYERS
DAVID E. ALDRICH
BY GEORGE P. SUTTON

Thomas S. MacDonald

ATTORNEY

United States Patent Office 2,940,256
Patented June 14, 1960

2,940,256

ULLAGE COMPENSATION FOR PRESSURIZING SYSTEMS

John R. Conyers, Reseda, David E. Aldrich, Whittier, and George P. Sutton, Downey, Calif., assignors to North American Aviation, Inc.

Filed Mar. 26, 1954, Ser. No. 419,068

5 Claims. (Cl. 60—39.48)

This invention is directed to various forms of ullage compensators for use in pressurizing systems. The word "ullage" is used to describe the free space above the surface of the liquid contained in a tank.

A particular problem arises in obtaining rapid delivery of any liquid from a tank by pressurization when an empty space is present in the tank. This problem is particularly acute when the tank must be pressurized rapidly at various temperatures. When such tank is subjected to operating conditions in various temperature ranges the liquid within the tank contracts and expands as the temperature decreases or increases, thus giving various amounts of ullage or free space in the tank.

In order to rapidly increase delivery pressure to a predetermined value it is desired that all, or the major part, of the main pressurizing medium act directly on the liquid. If it is necessary that the main pressurizing medium first act to pressurize the ullage it is impossible to rapidly increase the delivery pressure to a predetermined value. This problem is particularly important in designing rocket power plants in which propellants are supplied by a pressurized feed system as distinguished from a system in which the propellants are pumped to the combustion chamber. It is necessary that the propellent tank be rapidly pressurized at the start of the firing sequence. The volume of propellant being expelled from the tank or tanks opens burst diaphragms or other normally closed valves and instantly initiates combustion. All of this preliminary pressurization must be accomplished rapidly over a wide range of temperatures. The temperatures will vary from −65° F. to 160° F. Use of the instant invention is contemplated within and without this range. The previous methods and apparatus utilized in tank pressurization do not allow for pressurization at the rapidity contemplated by the instant invention. The variation in tank volume of certain propellants over a temperature range of −65° F. to 160° F. becomes an extremely significant factor when it is realized the expansion space has to be provided in the storage system since propellant containers must be confined volumes. As a rule, the storage systems or propellent containers contain one of many oxidizers and one of many fuels. Spill-over of oxidizers and loss of any propellant cannot be permitted. As an example of this problem, a propellant with a residual temperature of −65° F. completely contained in a tank at some definite pressure will expand as its temperature is raised to 160° F. Approximately 20% more volume will have to be provided in an ullage or similar space with increased volume in order to maintain the original definite pressure in the storage system. In the field of rocketry it is necessary that a stated ratio of oxidizer and fuel be delivered at a prescribed pressure and during a short time interval to the combustion chamber in order to obtain constant rocket performance, measured as the time-to-a-one-thousand-yard target. With former pressurizing methods the variable and increased time, due to the variable ullage space, required to pressurize each propellant up to the operating value is of sufficient magnitude to preclude meeting the operating requirements. In addition, certain rocket engines have less than rated propellent flow during operation on cold days because of the variable ullage condition, and consequently produce less than rated thrust.

It is therefore an object of this invention to provide means to obtain rapid pressurization of fluid in a tank.

A further object of this invention is to provide means to obtain rapid pressurization of the fluid in a propellent tank by providing a fast-burning charge for pressurizing any ullage present in the system.

A particular object of this invention is to provide an ullage compensating system in which a relatively fast-burning medium pressurizes the ullage with extreme rapidity while a relatively slow-burning charge provides a steady pressure to expel the propellants from the propellent tanks.

A further object of this invention is to provide separate gas generating systems which compensate for the change in volume of the propellants due to temperature differences.

An additional object of this invention is to provide a rocket having an ullage compensating system which enables the rocket to efficiently operate under all standard ambient conditions.

A further object of this invention is to incorporate various ullage compensating devices in rocket structure.

A still further object of this invention is to provide a variable fast-burning means for rapidly pressurizing the variable ullage in a fluid-filled container subjected to major changes in ambient temperature.

Other objects of the invention will become apparent from the following description taken in connection with the accompanying drawings, in which:

Fig. 1 is a cross section of a rocket incorporating the basic features of the instant invention;

Fig. 2 schematically shows the ullage compensating system of Fig. 1 including a release valve;

Fig. 3 schematically shows an ullage compensating system in which the rate of burning of the fast-burning charge is controlled by a thermal element;

Fig. 4 schematically shows a modification of Fig. 3 including a thermally-controlled revolving gate;

Fig. 5 schematically shows ullage compensating means having means to shift the flow of gases from the fast-burning ullage charge; and Fig. 6 schematically shows a fast-burning liquid propellent sub-assembly for rapidly pressurizing the ullage in a liquid containing tank.

In the various illustrated modifications of ullage compensating devices a "slow-burning" main gas generator is associated with a "fast-burning" gas generator. The latter gas generator rapidly pressurizes the ullage present in the system while the former gas generator provides a steady stream of pressurizing gas to maintain a pre-planned pressure on the liquid at its designed flow rate from the container into a thrust chamber.

The invention in its over-all aspects is illustrated in Fig. 1. Fig. 1 shows a cross-sectional view of the rocket in which an ullage compensating means is incorporated. The rocket 80 comprises a warhead 81, an ullage compensating system later to be described, oxidizer and fuel tanks 86 and 92, an ignition system 90, 91, a combustion or thrust chamber 99, a throat section 100, and an exhaust section 101. The ullage compensating and pressurizing section comprises a forward bulkhead 82 having a filling port 82a, a deflection chamber 103, an exhaust tube 102, a fast-burning ullage grain 87, a relatively slow-burning main pressurizing grain 88, an igniter squib 90, and igniter grains 91. In operation the squib 90 is electrically ignited from an outside source and, in turn, ignites the igniter grains 91. These grains, in turn, ignite the grains 88 and 87. The gases evolved by the rapid burning of the grains 87 and the slower steady burning of the grains 88 travel along exhaust tube 102 into the deflection chamber 103, burst the diaphragm 85 and force the propellant out of tank 86 through the burst diaphragm 98. At the same time, the gases burst the diaphragm 89 and force the propellant out of the tank 92 through the burst diaphragm 93. The propellants are then injected by means 94 into combustion chamber 99, flow through the throat section 100 and are exhausted through exhaust section 101 providing the necessary thrust for the rocket. The action of the fast-buring grain rapidly pressurizes any ullage present in the respective propellant tanks. At the same time, the fast-buring grain and slow-burning grain force a sliding injector 94 in an aft direction against collapsible ring 97. The sliding injector is locked in place after the sliding movement by a snap ring or spring projection 95 falling into a channel or detent means 96. The action of the slidable injector removes supports from burst diaphragms 98 and 93 permitting their opening by the pressurizing charge. Incorporated in Fig. 1 is a relief valve 84 which is adapted to prevent over-pressurization of the propellant tanks. This protects the propellant container against excessive pressure during all phases of the entire operation. The relief valve must be such as to withstand high temperatures and is adapted to exhaust into an aft-facing thrust-producing nozzle for useful thrust or into tangential torque-producing nozzles for spinning action. Any excess gas from the fast-buring charge which produces a pressure in excess of the operational pressure causes the fast-acting, high-temperature-resistant relief valve 84 to open, discharge the excess gas overboard, and thereby protect the propellant and ullage container from over-pressurization.

Fig. 2 schematically shows the ullage compensating means shown in Fig. 1. A propellant tank 10 is filled with a liquid and has an ullage space 16 thereover. This ullage space varies as the liquid in the tank 10 contracts and expands due to changes in ambient temperature. The system of Fig. 2 includes a main pressurizing means 11, comprises a steady relatively slow-burning charge to effect pressurization of the liquid within the tank to expel such liquid from the tank. A fast-burning grain 12 is provided along with a high-temperature-resistant relief valve 15 to rapidly pressurize the free space or ullage in the container. Line 13 conducts the pressurizing gases to the ullage space 16 and propellant tank 10. Upon ignition of either of the charges 11 or 12, simultaneously, or one before the other, the pressurizing gases quickly pressurize the ullage present in the container and the slow-burning pressure charge then continues to expel the liquid in tank 10 through line 17 after bursting the diaphragm 18. The propellants are then injected into the rocket thrust chamber schematically shown as the block 19. The ullage pressurization charge can be contained in the same gas generator as the main propellant pressurizing charge. Furthermore, the high-temperature release valve can be connected directly to the ullage container instead of the line 13. Furthermore, as set out above, the relief valve can exhaust into an aft-facing thrust-producing nozzle for useful thrust or into a tangential torque-producing nozzle for spinning action. In any of the modifications using a solid ullage pressurization charge, such charge can be a rigid grain, pelleted grains, or disc-type grains and may be placed in suitable containers, such as cloth bags.

The pressurizing sequence is initiated according to one of three procedures; the choice not affecting the principle of the invention. The main propellent pressurization system may be put into operation first, to be followed at a desired time interval by the ignition of the ullage pressurizing charge 12. This procedure has certain advantages such as filling the feed line 13 from an outside supply before the pressure surge from the ullage charge starts. The ullage pressurizing charge may be ignited first, to be followed by the build-up of steady pressure from the main propellent pressurizing system. This procedure has certain advantages such as providing hot-gas pressure in the chamber containing the slow-burning grain and thus promotes the reliable ignition of the large slow-burning grain without the use of blow-out diaphragms or valves. The increase in pressure may be initiated simultaneously from the ullage pressurizing charge and the propellent pressurizing charge by a definite timing procedure. This procedure also has certain advantages such as reduction of ignition and starting-time lag. In all three procedures the ullage is rapidly filled with a gas and brought up to the operational pressure of the propellent system by means of igniting and consuming a "fast-burning" charge of a solid mixture containing an oxidizer and a fuel. The size or amount of the fast-burning charge is determined according to the extreme condition which is when the propellant is at its lowest residual temperature and the ambient pressure on the relief valve is at the minimum altitude pressure.

Fig. 3 incorporates in the basic invention illustrated in Fig. 2 means to control the pressure from the gas generator. In Fig. 3 the propellent tank 20 is in communication with a gas generator comprising a slow-burning charge or propellent grain 21 and a fast-burning charge or ullage pressurizing grain 22. In the communicating line 23 is placed a fixed orifice 24 and a temperature-controlled bleed valve by-pass. The bleed by-pass may include, for example, a movable member 25 actuatable by movement of the thermal element 26 under changes in ambient temperature. Ignition of the grain 22 rapidly pressurizes the ullage 27 and the gas from the propellent grain 21 forces a steady stream of propellant through the burst disphragm 28 into the injector and power plant 29. The fast-burning grain, for pressurizing the tank ullage rapidly, is designed for when the ullage condition is at a maximum which is at the lowest operational ambient temperature. Gradual changes in propellant or fluid volume, resulting from changes in ambient temperature, cause a corresponding change in volume of the ullage. The same changes in ambient temperature open or close the bleed valve 25 a calibrated amount, the lower ambient temperature producing a more restrictive bleed opening.

The firing sequence starts with the ignition of all the grains or charges in the gas generator. The pressure rapidly rises, primarily by the more rapid burning of the ullage grain, until equilibrium is reached. Then the solid propellant or slow-burning grain burns at a rate which is a function of the chamber pressure acting on the burning surface. When the ambient temperature has caused a large ullage the chamber pressure is kept high by means of the reduced bleed by-pass around the fixed orifice 24 and the solid propellant or charge burns more intensely, producing more gas products to fill the ullages and to pressurize the liquid in the tank. It is to be understood that the illustrated fixed orifice and by-passed bleed means is only illustrative. Equivalent types of thermally-responsive bleed valve by-passes may be employed. In Fig. 3 the temperature control bleed valve releases chamber pressure from the gas generator around a fixed orifice at a rate which is a function of the pressurization requirements for the particular ambient temperature.

Fig. 4 shows a further modification of a thermally controlled ullage pressurizing means. In Fig. 4 as in the previous modifications of the basic device, a rapid surge of pressurizing gas is provided at the beginning of the firing action to pressurize the ullage and a steady supply of pressurizing gas is supplied for maintaining a preplanned pressure on each propellant at its designed flow rate from the propellant or liquid tanks into the thrust chamber. The pressurizing system of Fig. 4 comprises a tank 30 containing suitable propellants or other liquids and a pressurizing line 33 which conducts pressurizing gas from the gas generator 31, 32. The gas generator comprises a slow-burning charge or steady-supply section 31 for supplying constant pressurization to displace the propellant in the tank as it is consumed in the power unit 39. In addition, there is an ullage pressurization section or charge comprising a series of small, individual, fast-burning ullage pressurization grains 32. Positioned internally of the series of small individual grains is a temperature positioned gate 34 which is rotatable by means of an exterior thermal element 36. Ports 35 are provided on the gate 34 to uncover particular portions of the ullage grains according to the exterior ambient temperature. Rapid pressurization of any ullage present in the system by means of the fast-burning grains and steady flow of the propellants from the tank by the steady pressurization by the slow-burning grains will open the diaphragms or other type of one-way valves 38 to force the propellant or propellants into the injector and power plant 39.

Gradual changes in propellant or fluid volume, resulting from changes in ambient temperature, cause a change in the volume of the ullage. The same changes in ambient temperature cause a lengthening or shortening of the spiral bi-metallic thermal element 36. This change rotates the temperature position gate 34 to uncover an amount of fast-burning solid charge which will rapidly provide the gas volume needed to pressurize the ullage at that particular instant. The remaining ullage charges 32 are either not uncovered by a port or the port is opposite the restricted, inhibited or non-burning surface of those grains.

The firing sequence starts with the ignition of the main or steady slow-burning grain. Almost immediately the heat and pressure ignites those fast-burning ullage grains which have nonrestrictive areas exposed by the ports or openings of the temperature position gate 34. The pressure in the gas generator actuates a lock on the gate in order to avoid further rotation during the firing sequence.

The combined pressures fill the tank ullage and rapidly raise the pressure to the designed operational level. Approximately at that time the ullage charges burn out and continued burning of the main grain keeps steady pressure on the propellant as it flows into the injector and power unit 39.

It is to be understood that the propellant tank in any of the modifications may contain one or more discrete propellant components. In the illustrated Fig. 4 a flexible wall 30b is provided separating fuel and oxidizer compartments 30a and 30c. Suitable burst diaphragms 38 are provided in each section. Section 30c is completely filled with fluid and expansion of that fluid will be compensated for by movement of the flexible wall 30b. The ullage contained in propellent section 30a will be rapidly pressurized by the fast-burning grains 32.

The device illustrated in Fig. 5 obtains rapid pressurization of the ullage in any propellant or liquid container by utilizing, in correct relationship, a fast-burning, solid propellent charge and a gas-flow shifting double valve. Fig. 5 shows a propellent tank 40 having a flexible ullage container 48 therein. Communicating with the interior of the ullage container is a main pressurizing charge 41 and an ullage pressurizing charge 42 of the "fast-burning" type. As illustrated, the ullage pressurizing charge section 42 has a flow-shifting valve 44 therein. This valve 44 has off-set ports 45 and 46, and some type of retaining device such as a shear pin 47.

The ullage container 48 is in the form of an expandable bag which expands and contracts owing to changes in the ambient temperature. The flexible bag is filled with a measured quantity of Freon, air, or other suitable compressible medium, which prevents vaporization of the propellant by keep more than vapor pressure acting on the propellant. Such bag must be made of material which is flexible and compatible with the medium which it will be in contact with. Thus, if an acid oxidizer is used to fill the tanks around the ullage container 48 in the tank 40, such ullage bag must be of an acid-resistant material.

When oxidizers are in contact with the bag, it has been found that such materials as tetrafluoroethylene (Teflon) or polytrifluorochloroethylene (Kel-F) may be used. When a fuel such as turpentine is to come in contact with the ullage bag, such ullage bag may be made of Buna-N materials.

The ullage pressurizing charge 42 is fired by an igniter squib 42a. The gas generated by the ullage pressurizing charge rapidly builds up pressure in the connected system including the main gas generating system. Ignition of the slow-burning grains 41 and bursting of the diaphragm 48a follows, after which the aggregate hot gases flow into the ullage bag 48 in the propellent tank. By expansion of the bag, pressure in the propellent tank or tanks is built up and the propellant flows through the feed line 43 and bursts the burst diaphragm or one-way valve 49. When this pressure builds up to a specified value, normally about 10 percent below the tank operating pressure, the shear pin 47 fails, allowing the flow-shifting valve to move to the right as indicated by the arrow in Fig. 5 to close off the passage from the ullage pressurizing charge 42 to the main gas generated chamber 41 and open a passage 50 to the rocket thrust chamber as at 51. The flow of the ullage pressurizing gas from charge 42 through the valve port 45 ignites the burning charge 41, while the flow of the ullage pressurizing charge 42, after shifting of the double valve, ignites the main rocket propellants in the thrust chamber 51 through offset valve port 46. After the shifting of the valve 44, port 45 is out of alignment with the passage to chamber 41 and port 46 is in alignment with the passage 50 leading to thrust chamber 51. Both of these operations are optional, since both the main pressurizing charge in 41 and the injected propellants in 51 may be separately ignited. When gas flow from the ullage pressurizing charge 42 is shifted to flow into the line 50 such gaseous flow, if desired, may provide some of the initial thrust force of a rocket.

In order to directly coordinate the arrival of pressurized propellants in the thrust chamber through valve 49 with the start of the igniting flame (which results from shifting the gas flow from the ullage charge) the actuating mechanism of the double valve 44 can be directly connected to the shifting motion of a sliding valve-type thrust-chamber injector. In this case, the pressure acting upon the surface of the sliding injector is utilized for shifting the double valve, after overcoming the mechanical restraining force of a shear pin. In other words, injector 94 (Fig. 1), when moved aft by the propellent pressure, acts not only to uncover the thrust chamber injection ports but also moves valve 44 to the right as indicated by the arrow in Fig. 5 to shift the igniting flame to the thrust chamber. In the alternative, the gas flow from the ullage charge towards the injector can be utilized, if desired, to force the sliding valve type injector head to shift position and uncover the liquid propellent ports in the injector. A sliding injector of the type shown in Fig. 1 may be employed. The dotted lines in Figure 5 show the position of valve 44 after the flow has been shifted.

The ullage pressurizing charge can be contained in the same gas generator as the main propellent pressurizing grain, with one port of the double valve located in the pressure line connecting both to the propellent tank. Furthermore, the ullage pressurizing charge may be contained in the same gas generator as the main propellent pressurizing grain, but separated by a partition which mounts one port of the double valve.

The modification illustrated in Fig. 6 obtains rapid pressurization of the ullage in any propellant or liquid container by utilizing in correct relationship a "slow-burning" solid reactant gas generator and a variable flow, liquid-reactant, "fast-burning" gas generator. This modification reduces the possibility of over-pressurization of the bag during the initial phase of tank pressurization. The apparatus shown in Fig. 6 includes, in combination with the propellent tank 60, a main pressurizing gas generator 61 having a pressurizing line 64 and a feed line 68 extending therefrom and secondary reactant tanks 62 and 63 containing fuel and/or oxidizer adapted to be injected into a secondary pressurizing chamber 71. The secondary pressurizing means is of the "fast-burning" type. Unlike the previous modifications the fast-burning charge includes liquid reactants as distinguished from solid reactants. The secondary pressurizing system includes a burst diaphragm 65 in the line 64 leading to the reactant tanks 62 and 63. Line 66, having check valves 67, conducts the reactants through an injector into the chamber 71. Line 68 leading from the main pressurizing gas generator 61 to the secondary pressurizing chamber 71 contains a burst diaphragm 69. A burst diaphragm 73 is provided in a line 72 leading from the propellent tank 60 to the injector and power plant 74.

The ullage 70 in the propellent tank 60 is rapidly filled with a high pressure gas, at the start of the firing sequence, by means of a secondary pressurizing combustion in the secondary pressurizing chamber 71. The initial pressure from the relatively slow-burning, steady supply, main pressurizing system 61 supplies pressure to the small volume of propellant in the secondary tanks 62 and 63 after forcing open the burst diaphragm 65. Although there will be an ullage in the tanks 62 and 63, such ullage will be small enough to have no effect on the initial action. The secondary, fast-burning reactants are injected into the secondary pressurizing chamber 71 and burned therein. Ample size of the feed line between the secondary pressurizing chamber 71 and the propellant tank 60 will result in the pressure in the chamber 71 and the ullage 70 reaching equilibrium quickly. Thus, the pressure added to the initial pressure from the steady supply system, reaching the ullage through the line 68 and burst diaphragm 69, will rapidly fill the ullage 70 and bring it up to the desired propellent pressure. As the ullage pressure rises, likewise the pressure in the secondary chamber 71 rises. This rapidly decreases the difference between the pressure of the secondary reactants being supplied to the injector and the pressure of the chamber, thereby diminishing the flow of the secondary reactants in direct inverse relation to the demand. For instance, a cold day means more ullage to fill and in turn a greater secondary combustion action, of a slightly longer duration. When the pressure differential across the injector decreases below a selected minimum, combustion ceases and the remaining secondary reactants are left unused in the secondary propellant tanks 62 and 63. Check valves are required in each of the secondary feed lines.

The main pressurizing gas coming from the gas generator 61 may be fuel or oxidizer rich and then only one reactant, a fuel or oxidizer as the case may be, need be injected into the secondary pressurizing chamber 71 for second stage burning and ullage pressurization. Thus only one secondary reactant tank and secondary generator feed line would be necessary.

Each of the above modifications of the basic device, for rapidly pressurizing a container, provides a rapid surge of pressurizing gas at the beginning of the firing action due to a fast-burning charge. A steady supply of pressurizing gas from a relatively slow-burning charge is provided during the firing for maintaining a preplanned pressure on each propellant at its designed flow rate into the thrust chamber. In the case of rockets this steady flow provides the thrust for the rocket propulsion.

The above explained ullage compensating systems have been described in terms of their operation in a liquid propellent rocket engine. The uses of such ullage compensating systems are not limited to such liquid propellent rocket engines but are generally applicable where there is a demand for a rapid rise in pressure to a predetermined level to force a steady supply of liquid from a supply container. Thus, the entire system may be used to rapidly pressurize the fuel in a tank of a turbojet, a ramjet, a resojet or any reaction motor system. Furthermore, the entire system may be used to satisfactorily pressurize the liquids of a liquid reactant gas generator system or power unit. The use of the herein described means for rapid pressurization permits the containment, pressurization, and rapid delivery of many toxic, flammable and corrosive liquids or semi-liquids.

Each of the above means for effecting the rapid pressurization of fluid filled tanks acts to rapidly pressurize the ullage present in the tanks. Without these ullage compensating devices a cold generator, which operates at a relatively low pressure, must pressurize the ullage space to full tank operating pressure before normal operation of the rocket can begin. The result is a rocket which takes longer to start and hence takes longer to reach a specified target, when cold than when hot. The instant invention, of providing ullage compensating means, enables the ullage to be rapidly pressurized by means of a secondary pressurizing system and thus enables the main pressurizing means to act more directly on the propellants. Suitable provisions, in the form of vents or valves, are made in all the above modifications for removing trapped air and vapors from the propellent container and ullage system during filling operations.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Means for effecting the rapid pressurization of the liquid in a liquid-holding tank comprising an expansible ullage container within the liquid-holding tank, a relatively fast-burning, gas producing, ullage pressurizing charge, a main, relatively slow-burning, gas producing, pressurizing charge, means to ignite the fast-burning pressurizing charge, conduit means connecting said fast-burning and slow-burning charges, the fast-burning charge being adapted to ignite the slow-burning charge and to commence pressurization of the ullage container and the liquid within the tank, and shifting-flow valve means actuatable responsive to fast-burning charge pressures to shut off further flow of said fast-burning charge gases to said slow-burning charge, said valve means being actuatable at a predetermined point below full tank operating pressure.

2. In a rocket having a thrust chamber and an injector the combination with at least one propellent tank, of an expansible ullage container within the propellent tank, a main, relatively slow-burning, gas producing, pressurizing charge, a relatively fast-burning, gas producing, ullage pressurizing charge, means to ignite the fast-burning pressurizing charge, conduit means connecting said fast-burning and slow-burning charges, the fast-burning charge being adapted to ignite the slow-burning charge and to commence pressurization of the ullage container and the propellant within the tank, and flow-shifting valve means actuatable responsive to fast-burning charge pressures to shut off further flow of said fast-burning charge gases to said slow-burning charge and to redirect the flow of said fast-burning charge gases to the thrust chamber, said valve means being actuatable at a predetermined point below full tank operating pressure.

3. Means for effecting the rapid pressurization of a liquid in a liquid-holding tank, comprising a relatively fast-burning ullage pressurizing means; a main, relatively slow-burning pressurizing means; conduit means connecting said fast-burning and slow-burning means; means to ignite the fast-burning pressurizing means, the fast-burning pressurizing means being adapted to form a gas, rapidly pressurize any ullage in said tank and ignite said slow-burning pressurizing means; and shifting-flow valve means, actuatable responsive to a predetermined pressure below full tank operating pressure to shift the flow of gas produced by said fast-burning means away from said tank, said slow-burning pressurizing means being adapted to continue pressurization of said tank after the shifting of said valve means.

4. The invention as set out in claim 3 in which a flexible bag is within the liquid-holding tank, said bag having an interior in communication with said fast-burning and said slow-burning pressurizing means whereby gas formed from each of said pressurizing means expands said bag to effect pressurization of said tank.

5. The invention as set out in claim 4 further including a burst diaphragm between said flexible bag interior and said fast-burning pressurizing means.

References Cited in the file of this patent

UNITED STATES PATENTS

| | | |
|---|---|---|
| 2,366,165 | Whitworth et al. | Jan. 2, 1945 |
| 2,390,635 | Barker et al. | Dec. 11, 1945 |
| 2,597,641 | Hull et al. | May 20, 1952 |
| 2,671,312 | Roy | Mar. 9, 1954 |